United States Patent [19]
Cushman

[11] 3,750,265
[45] Aug. 7, 1973

[54] METHOD OF PREFORMING SOLDER TO A PLURALITY OF TERMINALS
[75] Inventor: Robert H. Cushman, Bethayres, Pa.
[73] Assignee: Jade Corporation, Huntingdon Valley, Pa.
[22] Filed: Apr. 5, 1972
[21] Appl. No.: 241,156

[52] U.S. Cl............... 29/471.3, 29/471.1, 29/475, 29/480, 29/502, 29/628, 29/630 R, 156/220, 228/56
[51] Int. Cl........................................... B23k 31/02
[58] Field of Search...................... 29/471.1, 471.3, 29/502, 628, 630 R, 630 B, 630 C, 475, 480, 630 G; 228/56; 156/220; 113/119

[56] References Cited
UNITED STATES PATENTS
1,027,240  5/1912  Clement............................ 29/630 C
1,399,769  12/1921  Hodgkinson..................... 228/56 UX
1,837,238  12/1931  Siegmund........................... 29/630 C
2,216,510  10/1940  Burns................................. 29/630 C
2,624,820  1/1953  Payette........................... 29/630 C X
2,711,577  6/1955  Leach................................ 29/480 X
2,961,762  11/1960  Clark et al........................ 29/630 C
3,499,211  3/1970  Dubuc............................. 29/630 R X
3,568,301  3/1971  Shibata........................... 29/630 C X Primary Examiner—J. Spencer Overholser
Assistant Examiner—Ronald J. Shore
Attorney—Arthur H. Seidel, Joel S. Goldhammer et al.

[57] ABSTRACT

A method of preforming solder and soldering a plurality of leads to a plurality of terminals by using a single heating step. A solder strip is applied transversely to the axis of a plurality of terminals. The solder is pressed or rolled in place and shaped to be thinner in cross section in the area between the terminals.

13 Claims, 7 Drawing Figures

PATENTED AUG 7 1973 3,750,265

METHOD OF PREFORMING SOLDER TO A PLURALITY OF TERMINALS

This invention relates to a method of preforming solder to a plurality of terminals. More particularly, this invention relates to a method of preforming solder to a plurality of terminals and to a method of soldering a plurality of leads to a plurality of terminals by using a single heating step.

As used herein solder means any metal or metallic alloy used to join metallic surfaces by melting the metal or metallic alloy and then allowing it to cool. A solder strip as used herein means an elongated element of solder of any cross section including, but not limited to, round, square, rectangular, flat, triangular or any other cross section.

Presently in the electrical arts, it is common to produce a plurality of electrical components and often a plurality of electrical circuits in a single modular unit. Some of these modular units, especially those relating to integrated circuits, are sometimes referred to as chips. HOwever, in both the integrated circuit technology and discrete component technology, there is a strong trend toward placing a number of components within one enclosed plastic modular unit with a plurality of terminals extending from the modular unit. The plurality of terminals is usually arranged in a plane along one or both sides of the modular unit. The plurality of terminals may also be arranged in two planes extending from one side of the modular unit or any other suitable manner. As an example, there may be 13 terminals in a single plane. However, the number of terminals arranged in a single plane varies with the particular manufacturer and the needs of the circuit encapsulated.

In the past, it was necessary to individually solder the required lead to each of the plurality of terminals to be used. This was a slow, tedious and time-consuming endeavor. In addition, poor connections and other faults due to an improper amount of solder on each terminal were hard to avoid and quite common. If too little solder was applied to any particular terminal, a poor connection would result. If too much solder was applied to any particular terminal, there was possibility that adjacent terminals would be shorted together.

The present invention provides as an important advantage the feature that the amount of solder applied to each terminal is effectively premeasured. Other advantages of the present invention include the fact that a plurality of leads may be soldered to a plurality of terminals in a single heating step. Furthermore, the solder may be applied to the plurality of terminals in either one or two steps. The solder is applied to each of the plurality of terminals in a uniform shape which therefore aids in producing uniform bonding between the leads and terminals of good quality.

Briefly, the present invention comprises the methods of preforming solder to a plurality of terminals and of soldering a plurality of leads to a plurality of terminals by using a single heating step. A solder strip is applied transversely to the axis of the plurality of terminals. The solder is deformed by pressing or rolling it into place substantially into the plane of the terminals. The solder may be reduced in dimension in a direction substantially perpendicular to the plane of the terminals in the areas between the terminals either simultaneously with the pressing or rolling during the deforming step or in a second step by a second press or roller. Once the solder is preformed to the terminals, a lead or leads may be applied to each terminal and the bonding process completed by a single simultaneous heating of the plurality of terminals and leads.

For the purpose of illustrating the invention, there are shown in the drawings forms which are presently preferred; it being understood, however, that this invention is not limited to the precise arrangements and instrumentalities shown.

Figures 1, 3:
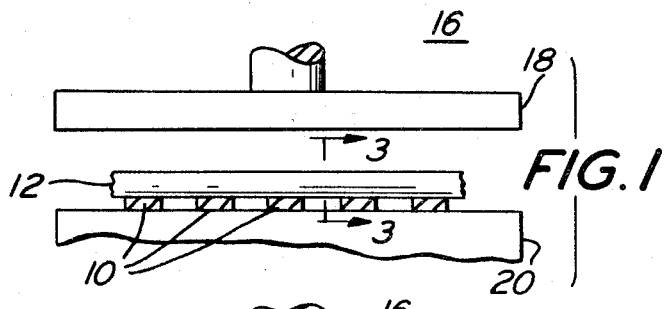
FIG. 1 is a view of one apparatus which may be used in practicing the method of the present invention.
FIG. 3 is a cross sectional view taken along line 3—3 of FIG. 1.

Referring now to the drawings in detail, wherein like numerals indicate like elements, there is shown in FIG. 1 terminals 10 and a solder strip 12. The solder strip 12 may be applied transverse to the longitudinal axis of terminals 10 by means of an automatic unwinding machine or unwinding the solder strip 12 from a roll, manually, or by any other suitable means.

A cross section of the solder strip taken along line 3—3 is shown in FIG. 3. Referring to FIG. 3, there is shown the solder strip 12 which may have a round or circular cross section. The solder strip 12 may be provided with a flux core 14. Although the flux core 14 is not necessary, it is preferable that the solder strip 12 have a flux core 14 in order to aid in the soldering process.

Figure 2:
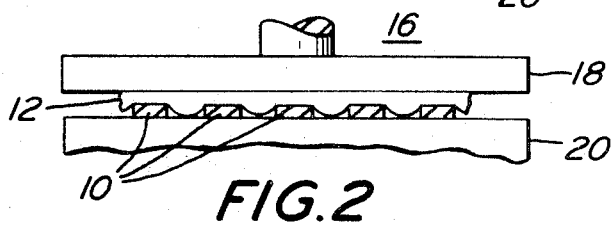
FIG. 2 is a view of the apparatus of FIG. 1 in the process of deforming the solder strip into the plane of terminals.

Referring now to FIGS. 1 and 2, there is shown a press 16 having an upper ram 18 and a lower ram 20. The press is shown in FIG. 2 in the process of deforming the solder strip 12 into the plane of terminals 10.

After the solder strip 12 has been deformed into the plane or substantially into the plane of terminals 10, the cross section of the dimension of the solder in a direction substantially perpendicular to the plane of the terminals in the area between the terminals 10 is reduced by means of rollers 22 and 24. Roller 22 is provided with protrusions 26. Roller 24 is provided with protrusions 28. The rollers 22 and 24 rotate in the directions of arrows 30 and 32, respectively. The dimension of the solder in a direction perpendicular to the plane of the terminals 10 is reduced in the areas 34.

Although the above method has been described as applying the solder strip 12, then deforming the solder strip 12 into the plane of the terminals 10 and then reducing the dimension of the solder in a direction substantially perpendicular to the plane of the terminals in the areas between the terminals 10, it is understood that the plates 18 and 20 may be suitably shaped to have protrusions thereon between the terminals 10 and therefore eliminate the third step which uses the rollers 22 and 24.

Figure 5:
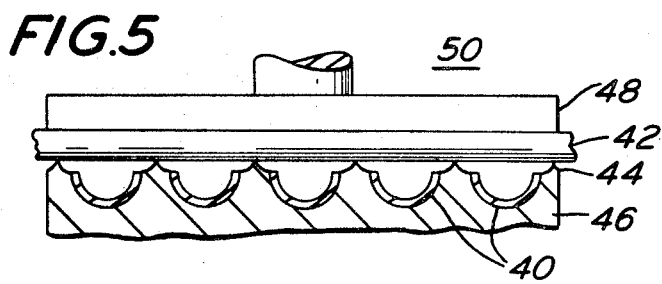
FIG. 5 is a view of another apparatus for practicing the present invention which eliminates the rolling step.

Referring now to FIG. 5, there is shown terminals 40 which may be semi-circular in cross section. A solder strip 42 is applied across the protrusions 44 of shaped lower ram 46. The solder strip 42 may be applied as described above.

Figure 6:
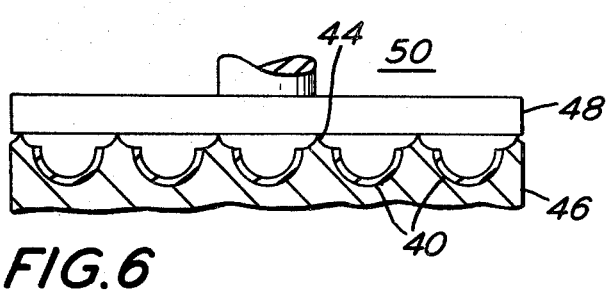
FIG. 6 is a view of the apparatus of FIG. 5 in a different position.

After solder strip 42 is applied across the protrusions 44 of lower ram 46, upper ram 48 of press 50 is lowered into contact with the solder strip 42 as shown in FIG. 5. As shown in FIG. 6, as upper ram 48 continues to be lowered, the solder strip 42 is deformed into and above terminals 40.

Figure 7:
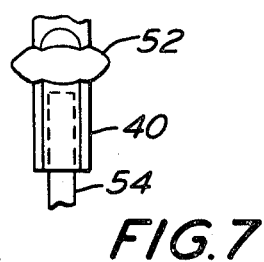
FIG. 7 is a view of a terminal having preformed solder thereon.

A single finished terminal 40 is shown in FIG. 7. Terminal 40 in FIG. 7 is shown with preformed solder 52 thereon. Preformed solder 52 has been shaped from solder strip 42 by means of the described process. Terminal 40 in FIG. 7 is also shown with a lead 54 mounted thereon. By applying heat to terminal 40 the solder is caused to melt and run between lead 54 and terminal 40. As the solder cools, a bond is formed between the lead 54 and terminal 40. During the heating operation, terminal 40 may be in any position, vertical or horizontal, as the molten solder will flow between lead 54 and terminal 40 due to capillary action.

Figure 4:
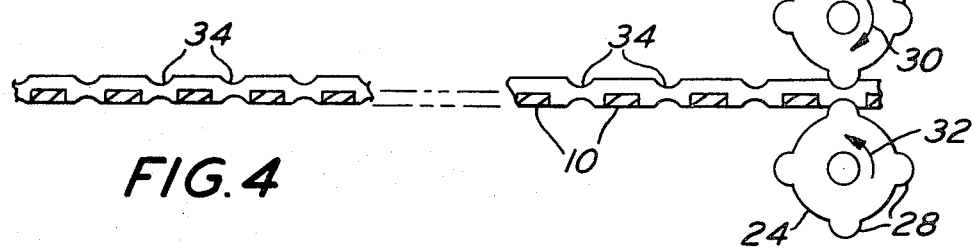
FIG. 4 is a view of a roller apparatus which may be used in practicing the present invention.

Referring now to FIG. 4, if a lead or leads is mounted above the solder on each terminal 10, and heat applied to the plurality of terminals 10, a bond will be formed between each terminal 10 and the corresponding lead. The solder in the reduced areas 34 elts upon the application of heat. By reason of the surface tension effect, the solder is drawn to terminals 10 on each side of the reduced area 34. Therefore, a bond is formed between the terminals 10 and the corresponding lead pleaced upon each of the terminals 10 and the solder between adjacent terminals 10 is automatically removed.

The present invention may be embodied in other specific forms without departing from the spirit or essential attributes thereof and, accordingly, reference should be made to the appended claims, rather than to the foregoing specification as indicating the scope of the invention. melts

I claim:

1. A method of preforming solder to a pluraltiy of terminals substantially in a plane comprising the steps of:
    applying a strip of solder to the terminals in a direction substantially transverse to the longitudinal axis of the terminals; and
    deforming the strip of solder substantially into the plane of the terminals with reduced areas of thickness of the solder in the areas between the terminals.

2. A method of preforming solder to a plurality of terminals substantially in a plane comprising the steps of:
    applying a strip of solder to the terminals in a direction substantially transverse to the longitudinal axis of the terminals;
    deforming the strip of solder substantially into the plane of the terminals; and
    reducing the dimension of the solder in a direction substantially perpendicular to the plane of the terminals in the area between the terminals.

3. A method of preforming solder to a plurality of terminals substantially in a plane according to claim 2 wherein said applying step comprises the step of unraveling a strip of solder from a roll and drawing it across the terminals.

4. A method of preforming solder to a plurality of terminals substantially in a plane according to claim 2 wherein said deforming step comprises the step of pressing the strip of solder against the terminals to force the solder substantially into the plane of the terminals.

5. A method of preforming solder to a plurality of terminals substantially in a plane according to claim 2 wherein said deforming step comprises the step of rolling the strip of solder against the terminal to force the solder substantially into the plane of the terminals.

6. A method preforming solder to a plurality of terminals substantially in a plane according to claim 2 wherein said reducing step comprises the step of pressing a first and a second shaped plate against the solder filled plane of terminals from opposite sides of the plane to form thinner areas of solder between the terminals.

7. A method of preforming solder to a plurality of terminals substantially in a plane in accordance with claim 2 wherein said reducing step comprises the step of rolling a shaped roller against the solder filled plane of terminals to form thinner areas of solder between the terminals.

8. A method of soldering leads to a plurality of terminals substantially in a plane comprising the steps of:
    applying a strip of solder to the terminals in a direction substantially transverse to the longitudinal axis of the terminals;
    deforming the strip of solder substantially into the plane of the terminals;
    reducing the dimension of the solder in a direction substantially perpendicular to the plane of the terminals in the area between the terminals;
    placing a lead on each of the plurality of terminals to be soldered;
    heating the plurality of terminals causing the solder to melt; and
    cooling the plurality of terminals.

9. A method of soldering leads to a plurality of terminals in accordance with claim 8 wherein said applying step comprises the steps of unraveling a strip of solder from a roller and drawing it across the terminals.

10. A method of soldering leads to a plurality of terminals in accordance with claim 8 wherein said deforming step comprises the step of pressing the strip of solder against the terminals to force the solder substantially into the plane of the terminals.

11. A method of soldering leads to a plurality of terminals in accordance with claim 8 wherein said deforming step comprises the step of rolling the strip of solder against the terminal to force the solder substantially into the plane of the terminals.

12. A method of soldering leads to a plurality of terminals in accordance with claim 8 wherein said reducing step comprises the step of pressing a first and a second shaped plate against the solder filled plane of terminals from opposite sides of the plane to form thinner areas of solder between the terminals.

13. A method of soldering leads to a plurality of terminals in accordance with claim 8 wherein said reducing step comprises the step of rolling a shaped roller against the solder filled plane of terminals to form thinner areas of solder between the terminals.

* * * * *